UNITED STATES PATENT OFFICE.

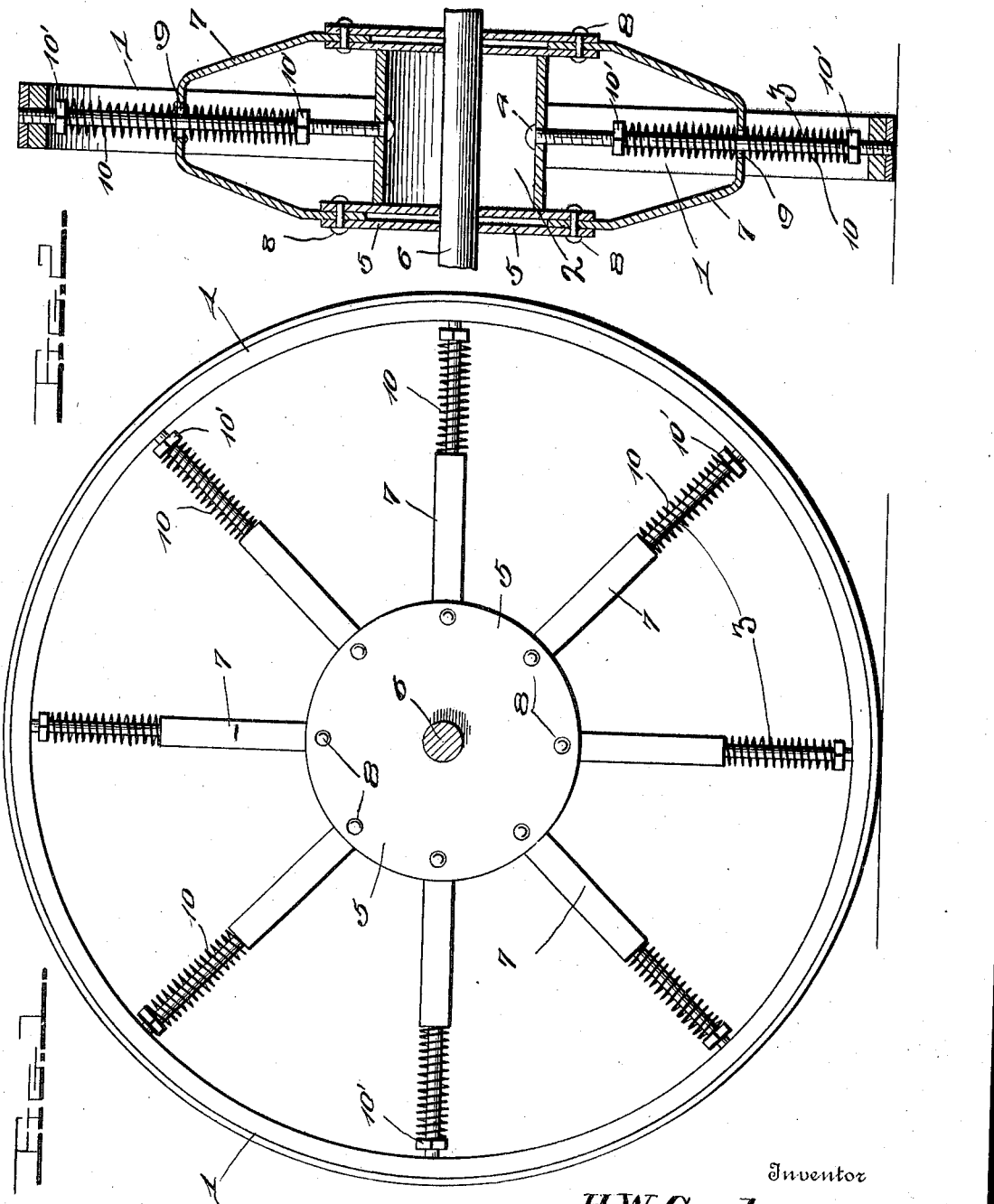

HARRY W. GOOD, OF LANARK, ILLINOIS.

SPRING-WHEEL.

1,036,828.

Specification of Letters Patent.

Patented Aug. 27, 1912.

Application filed February 26, 1912. Serial No. 680,022.

*To all whom it may concern:*

Be it known that I, HARRY W. GOOD, a citizen of the United States, residing at Lanark, in the county of Carroll and State of Illinois, have invented certain new and useful Improvements in Spring-Wheels, of which the following is a specification, reference being had to the accompanying drawings.

This invention relates to new and useful improvements in vehicle wheels, more particularly adapted for use on automobiles, and has for its object to provide a wheel of simple construction which will reduce to a minimum the shock and jar to the vehicle body due to the wheel striking or riding over a stone, rut, or other obstruction in its path.

Another object of the invention is to provide a device of this character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claim and shown in the accompanying drawings, in which—

Figure 1 is a side elevation of a vehicle wheel constructed in accordance with my invention; and Fig. 2 is a vertical sectional view.

Referring more particularly to the drawings 1 indicates the felly which is rigidly connected to the concentric inner rim 2 by means of the radial spokes 3, said spokes having their outer ends threaded into the rim as shown at 3' and heads 4 formed on the other end to hold them securely in place. Hub plates 5 are mounted on the axle 6 and arranged in pairs upon each side of the rim 2. U-shaped brace members 7 are provided having their ends pivotally secured between the hub plates 5 by means of the bolts 8, the intermediate portion of said members being provided with the elongated openings 9 to receive the spokes 3, said members having their intermediate portion slidably mounted on the spokes 3. Coil springs 10 are mounted on the spokes 3, said springs being arranged in two sets, one set being disposed between the outer adjusting nuts 10' and the outside of the intermediate portion of the members 7, the other set of said springs being disposed between the inner side of the intermediate portion of the U-shaped members and the inner adjusting nuts 10'.

A wheel constructed in accordance with my invention has nearly all its parts exposed to view and arranged so as to be readily accessible at all times without taking the wheel apart for the purpose of inspection and repair. Thus it will be seen that a broken part or defective spring can be easily taken out, replaced, or readjusted without affecting any of the other parts.

It will be seen from the accompanying drawings that the hub plates 5 and U-shaped members 7 can move in any direction, no matter from what direction the stress may come, when the wheel meets with an obstruction, while the spokes 3 and the rim 2 retain their normal position and the hub plates 5 and members 7 will resume their normal position by the action of the coil springs 10 after the wheel has passed over the obstruction.

While I have shown and described the preferred form of my invention, it will be obvious that various changes in the details of construction and in the proportions may be resorted to for successfully carrying the invention into practice without sacrificing any of the novel features or departing from the scope thereof.

Having thus described the invention what is claimed is:—

In a vehicle wheel, the combination of a felly, a concentric inner rim, rigid spokes having one end arranged in said inner rim and the other end detachably secured to the felly, hub plates mounted upon the axle and arranged in pairs upon each side of said rim, U shaped members having elongated openings formed in their intermediate portions to receive said spokes, said U shaped members having their ends arranged between and pivotally secured to each pair of the hub plates, coil springs mounted on said spokes and arranged between the intermediate portion of said U shaped members and the inner rim and felly, adjusting nuts mounted upon said spokes and adapted to engage one end of each set of springs to adjust the tension thereof.

In testimony whereof I hereunto affix my signature in the presence of two witnesses.

HARRY W. GOOD.

Witnesses:
  CLARENCE REUNER,
  D. A. REUNER.